United States Patent
Sturgill et al.

(10) Patent No.: US 9,485,222 B2
(45) Date of Patent: Nov. 1, 2016

(54) DATA STREAM TRAFFIC CONTROL

(71) Applicant: HEWLETT-PACKARD DEVELOPMENT COMPANY, L.P., Houston, TX (US)

(72) Inventors: Malgorzata M Sturgill, Fort Collins, CO (US); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 13/971,687

(22) Filed: Aug. 20, 2013

(65) Prior Publication Data

US 2015/0058622 A1 Feb. 26, 2015

(51) Int. Cl.
*H04L 29/06* (2006.01)
*H04L 9/06* (2006.01)

(52) U.S. Cl.
CPC .......... *H04L 63/0421* (2013.01); *H04L 9/065* (2013.01); *H04L 2209/42* (2013.01)

(58) Field of Classification Search
CPC .......... H04L 63/0823; H04L 63/0838; H04L 63/0846
USPC ........................................................ 713/160
See application file for complete search history.

(56) References Cited

U.S. PATENT DOCUMENTS

| | | | | |
|---|---|---|---|---|
| 7,634,145 B2 * | 12/2009 | Keith | ..................... | G06F 17/148 382/233 |
| 8,069,484 B2 | 11/2011 | McMillan et al. | | |
| 8,676,725 B1 * | 3/2014 | Lin | ....................... | G06N 99/005 706/12 |
| 9,075,476 B2 * | 7/2015 | Wang | ..................... | G06F 3/0418 |
| 2003/0037079 A1 * | 2/2003 | Wilber | .................... | G06F 7/588 708/250 |
| 2007/0165865 A1 * | 7/2007 | Talvitie | ............... | H04L 63/0428 380/286 |
| 2008/0215842 A1 * | 9/2008 | Kerschbaum | ....... | G06F 21/6254 711/167 |
| 2008/0256619 A1 * | 10/2008 | Neystadt | ............... | G06F 21/552 726/11 |
| 2009/0138590 A1 * | 5/2009 | Lee | ..................... | H04L 63/1425 709/224 |
| 2010/0024042 A1 * | 1/2010 | Motahari | ............. | G06F 21/577 726/26 |
| 2010/0027625 A1 * | 2/2010 | Wik | ...................... | G10L 19/002 375/240.12 |
| 2010/0080459 A1 | 4/2010 | Dai et al. | | |
| 2011/0138192 A1 * | 6/2011 | Kocher | ................. | G06F 21/602 713/189 |
| 2012/0137367 A1 * | 5/2012 | Dupont | ................... | G06F 21/00 726/25 |
| 2012/0237101 A1 * | 9/2012 | Kaempfer | ............. | A61B 6/032 382/131 |
| 2012/0259877 A1 | 10/2012 | Raghunathan et al. | | |
| 2012/0278628 A1 * | 11/2012 | Chen | ................... | H04L 63/0853 713/176 |
| 2013/0300591 A1 * | 11/2013 | Marpe et al. | ................... | 341/67 |
| 2014/0058992 A1 * | 2/2014 | Lucey | .................... | G06N 5/043 706/46 |
| 2014/0115715 A1 * | 4/2014 | Pasdar | ............... | G06F 21/6245 726/26 |
| 2014/0122442 A1 * | 5/2014 | Takenouchi | .......... | G06F 21/556 707/687 |
| 2014/0173291 A1 * | 6/2014 | Johnson | ................. | G06F 21/00 713/189 |

OTHER PUBLICATIONS

Dorfinger, D. P., "Real-Time Detection of Encrypted Traffic Based on Entropy Estimation," Salzburg, Aug. 2010, 98 p.
Xie et al., "Multimedia Encryption with Joint Randomized Entropy Coding and Rotation in Partitioned Bit Stream," Mar. 4, 2007, 18 p.

* cited by examiner

*Primary Examiner* — Hadi Armouche
*Assistant Examiner* — Sher A Khan
(74) *Attorney, Agent, or Firm* — HP Inc. Patent Department

(57) ABSTRACT

Techniques related to data stream traffic control are disclosed herein. A bit equivalent entropy of an anonymized data stream is computed. Traffic of the data stream is controlled based on the value of the bit equivalent entropy.

8 Claims, 7 Drawing Sheets

DATA STREAM TRAFFIC CONTROL

BACKGROUND

Nowadays, communication using data streams has become ubiquitous. Further, implementing processes based on real-time analytics that allow embedding operational and transactional applications actionable on the data stream is becoming pervasive.

One example of such processes is analyzing whether a data stream is encrypted or the type of data of a data stream. Thereby, it is facilitated increasing security within an organization. For example, encryption real-time analysis may be used to restrict output of a data stream that is considered to be cryptographically unsecure. Thereby, it can be prevented that data security is compromised by an outgoing communication. Further, traffic control based on data type facilitates securely outputting data streams and directing data stream to specific traffic targets or completely disallowing traffic.

BRIEF DESCRIPTION OF THE DRAWINGS

In order that the present disclosure may be well understood, various examples will now be described with reference to the following drawings.

DETAILED DESCRIPTION

Figure 1:
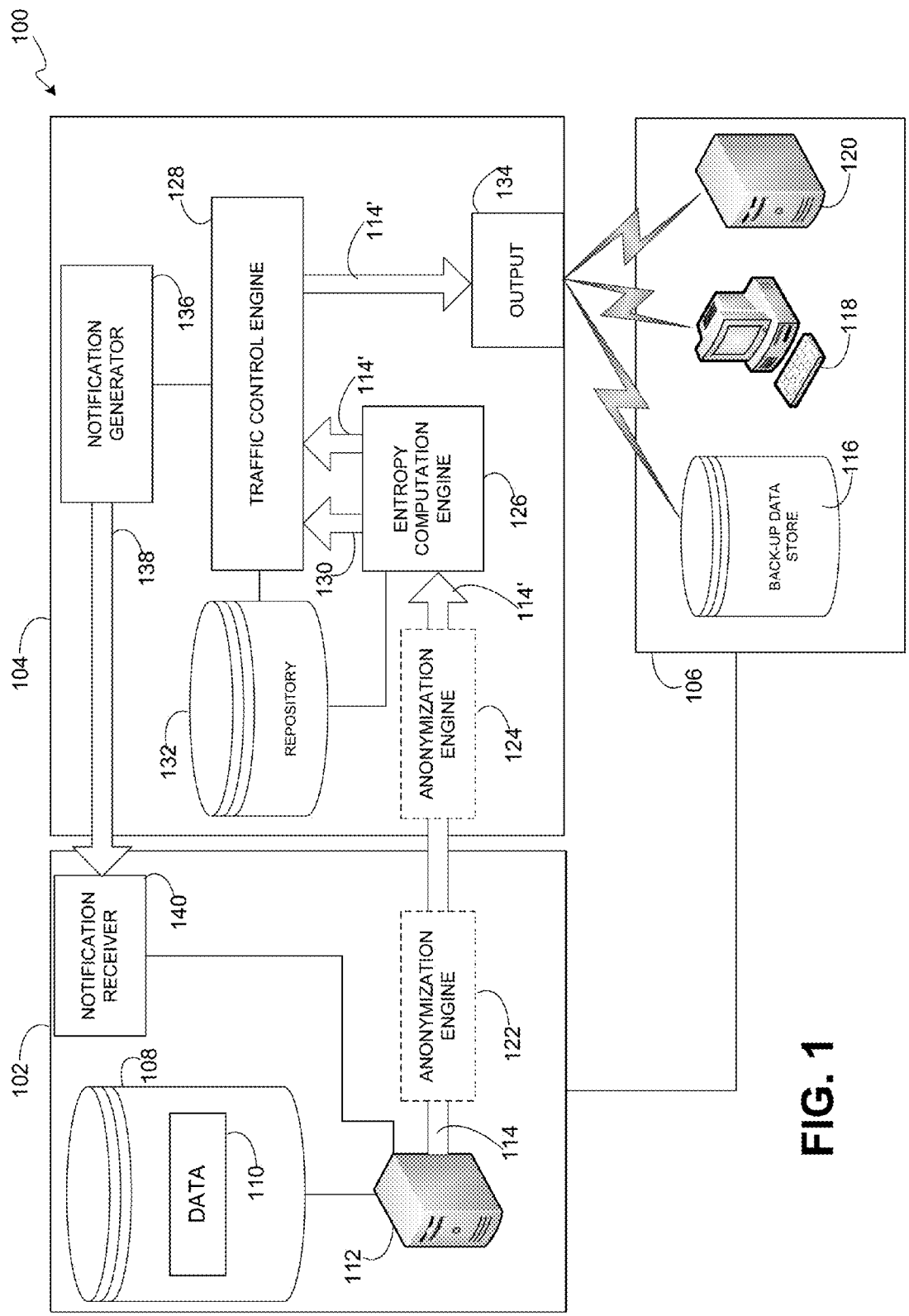
FIG. 1 is a block diagram illustrating an environment into which examples herein can be implemented.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

As set forth above, a data stream may be analyzed for facilitating traffic control. As used herein, a data stream refers to a sequence of digitally encoded coherent signals (packets of data or data packets) used to transmit or receive information that is in the process of being transmitted.

A real-time encrypted traffic detector (RT-ETD) has been proposed elsewhere, which detector is based on entropy estimation of a data payload. However, as the present inventors have understood, such a data analysis may raise privacy concerns since the entropy analysis may imply undesired direct access of information encoded in the data stream. This concern may be of particular relevance if the entropy based data analysis is implemented as a service. For example, an organization may require a service provider to implement a system that ensures that only encrypted information, or data of a certain type, is outputted to an external target. However, the organization may wish to maintain privacy of the data to be analyzed even for the service provider.

Therefore, at least some of the examples herein disclose computation of a bit equivalent entropy of the processed data stream that includes anonymized data. Thereby, it is facilitated an entropy based data analysis that does not compromise privacy of the party generating the data stream. Moreover, as the inventors have understood, the data anonymization may be performed without significantly affecting the entropy based analysis. For example, the entropy based data analysis may be performed by processed data anonymized via scrambling (e.g., by switching bytes of data in the data stream). As used herein, anonymized data refers to data modified such that a second party to receive the data via the data stream does not have direct access to the information encoded in the data. Scrambled data is an example of anonymized data. In specific examples herein, anonymization is performed while maintaining some specific characteristics. For example, anonymization may be performed such that entropy of the data stream is not modified or, at least, that the entropy is not varied beyond a certain level. Thereby, reliable data entropy based analysis of anonymized data is facilitated.

As used herein, a bit equivalent entropy of a data stream refers to an information entropy measurement based on the probability that a certain unit of information is found in the data stream. Specific examples on how a bit equivalent entropy can be computed are set forth below.

The following description is broken into sections. The first, labeled "Environment," describes an exemplary environment in which various examples may be implemented. The second section, labeled "Components," describes examples of various physical and logical components for implementing various examples. The third section, labeled as "Operation," describes steps taken to implement various examples.

ENVIRONMENT: FIG. 1 depicts an environment 100 in which various examples can be implemented. Environment 100 is shown to include a client system 102, a traffic control service system 104, and traffic targets 106.

Client system 102 may be constituted by a mixture of hardware and software on the premises of a particular organization. Client system 102 is configured to manage a set of data, e.g. a set of instructions executable by a processor to manage data generated within the particular organization. Client system 102 is shown to include a data store 108 storing data 110. Data 110 may be encrypted.

As used herein, encrypted data is data including information encoded in such a way that an undesired party (e.g., eavesdroppers or hackers) cannot read it, but that authorized parties can. In an encryption scheme, the message or information (referred to as plaintext) is encrypted using an encryption algorithm, turning it into an unreadable ciphertext. This is usually done with the use of an encryption key, which specifies how the message is to be encoded. In examples herein, bit equivalent entropy of encrypted data is higher than bit equivalent entropy of the non-encrypted data.

A server 112 is communicatively coupled to data store 108 for management of data 110. Server 112 is configured to generate a data stream 114 that is to be transmitted outside client system 102. For example, data stream 114 may be targeted to a back-up data store 116 for backing up organization's data 110, a terminal 118 that requires use of data 110, or an external server 120 for performing further processing of data 110. If data 110 is not encrypted, server 112 may cause encryption of generated data stream 114.

Client system 102 may include an anonymization engine 122 for anonymizing data stream 114 so as to generate an anonymized data stream 114'. It will be understood that there are different options for performing data anonymization. In a specific example, further set forth below, anonymization is performed via data scrambling. Details on how anonymization engine 122 may be constituted are further illustrated below with respect to FIG. 2. Anonymization engine 122 may be provided by a dedicated computing system (not shown) or implemented directly in server 112 so that data stream 114 is already anonymized when being transmitted from server 112. Anonymization engine 122 may be provided outside the premises of client system 102. For example, anonymization engine 122 may be provided at traffic control service system 104 (as illustrated in FIG. 1 by anonymization engine 124) or at another computing system (not shown) bridging client system 102 and traffic control service system 104.

Traffic control service system 104 may be constituted by a mixture of hardware and software on the premises of a service provider configured to control traffic of data stream 114. Traffic control service system 104 is shown including an entropy computation engine 126 to compute a bit equivalent entropy of anonymized data stream 114'. Entropy computation engine 126 may be connected to a repository data store 132 to facilitate keeping track of historical entropy values for streams from client system 102 and/or anonymized data stream 114'. Such a repository facilitates historical analysis from data streams transmitted by client system 102 while assuring privacy of information encoded in data stream 114.

Repository data store 132 may be not solely used for traffic monitoring, but may facilitate additionally logging and/or anomaly detection in data stream 114. As will be set forth in more detail below, entropy computed by entropy computation engine 126 may be indicative of the type of information encoded in data stream 114. For example, if data stream 114 is to provide certain text files, then changes in entropy of data stream 114 (e.g., an increase of entropy over time) might be an indication of rogue data being stored on data store 108 or poisoning of data stream 114.

Anonymized data stream 114' may be further transmitted to a traffic control engine 128 either directly, via entropy computation engine 126 (as shown in the illustrated example), or by any other transmitting element. Further, entropy computation engine 126 also transmits computed entropy 130 to a traffic control engine 128. Traffic control engine 128 is to control traffic of the data stream based on the computed bit equivalent entropy 130. More specifically, traffic control engine 128 is to cause further transmission of data stream 114 depending on the value of computed entropy 130. As set forth above, computed entropy 130 can be used to infer certain characteristics of data stream 114. For example, as further set forth below from the computed entropy, traffic control engine 128 may evaluate encryption status of data stream 140 and/or classify data stream 140 on data type. Further, traffic control engine 128 may be connected to repository data store 132 to check whether computed entropy 130 is indicative of an anomaly in data stream 114.

Depending on the result of the evaluation, traffic control engine 128 may cause forwarding data stream 114' to an output 134 of traffic control service system 104 or restrict further transmission of data stream 134. Restriction of data stream may include completely disallowing data traffic. For example, traffic control engine 128 may cause restriction of data stream 114 being further transmitted via output 134 upon data therein being determined to be cryptographically unsecure. Traffic control engine 128 may cause restriction of data stream 114 being further transmitted via output 134 upon data therein being determined to be not conforming to a certain data type or to be affected by an anomaly.

Further, traffic control engine 128 may be connected to a notification generator 136 to generated and transmit a notification 138 to a notification receiver 140 at client system 102 (or another notification control system). Notification 138 may be indicative of the traffic control result and may be used by client system 102 to determine status of transmission of data stream 114 towards any of traffic targets 106 as well as results of the entropy based analysis of data stream 114 (e.g., encryption status, data type classification, and/or detected anomaly).

Output 134 is to transmit data stream 114 to any of the traffic targets. Further, output 134 may direct data stream 114 based on the entropy evaluation referred to above. For example, depending of a data type identified via the entropy evaluation, output 134 may forward the data stream to a specific target (e.g., to terminal 118 in case it is identified that data stream 114 includes text data).

Figure 2:
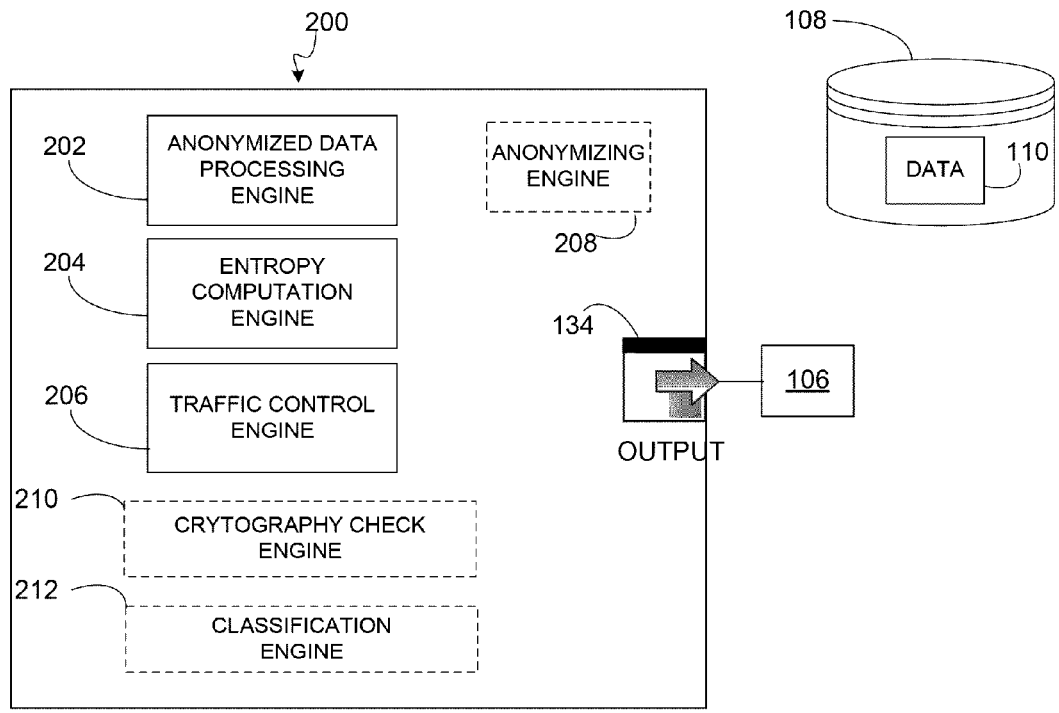
FIGS. 2 and 3 depicts a system for controlling data stream traffic according to examples.
Figure 3:
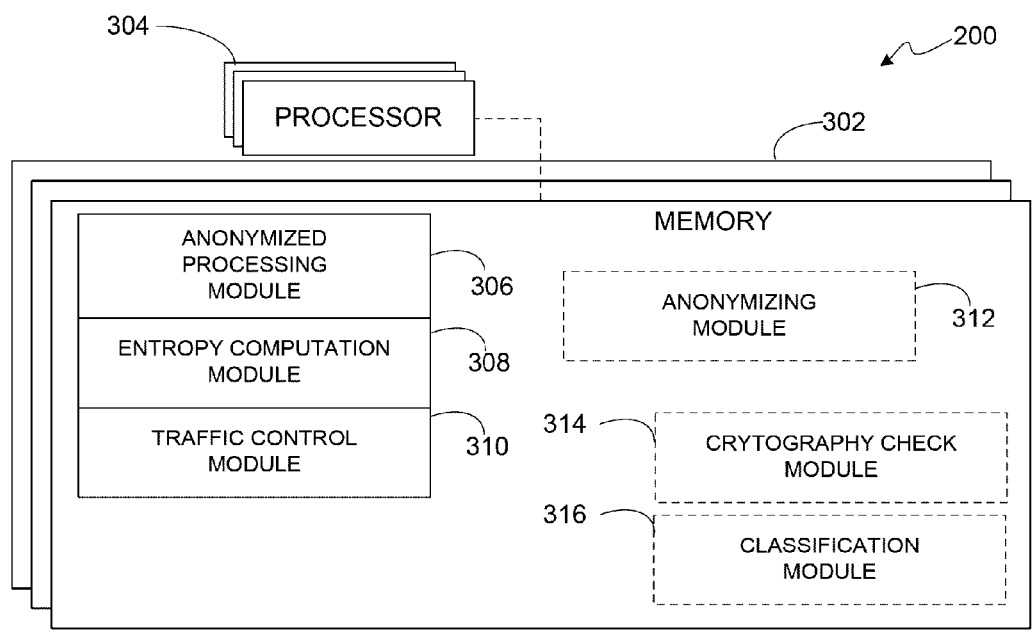

COMPONENTS: FIGS. 2 and 3 depict examples of physical and logical components for implementing various examples. In discussing FIGS. 2 and 3, reference is made to the diagram of FIG. 1 to provide contextual examples. Implementation, however, is not limited to those examples.

FIG. 2 depicts a system 200 for controlling traffic of data stream 114. In the example of FIG. 2, system 200 includes an anonymized data processing engine 202, an entropy computation engine 204 and a traffic control engine 206. In the illustrated example, an anonymizing engine 208, a cryptography check engine 210, and a classification engine 212 are shown as optional elements that might be incorporated in system 200.

Anonymized data processing engine 202 represents generally any combination of hardware and programming configured to cause processing of an anonymized data stream 114'. It will be understood that there are a variety of possibilities on how data stream 114 might be anonymized. In some examples, further illustrated below with respect to FIGS. 4 and 6, data stream 114 is anonymized by at least a portion thereof being scrambled, e.g., by a random re-arrangement of bytes in an original byte sequence in data stream 114.

The processing performed by engine 202 may include receiving and making available anonymized data stream 114' to entropy computation engine 204. The processing may include further functionality, for example checking whether a received data stream 114 is analyzed. For example processing engine 202 may process a received data stream 114 and determine whether information is readable therefrom (this being indicative that data stream 114 is not anonymized). A data stream 114 may comprise a header indicating whether the included data has been anonymized or not. If engine 202 determines that the received data stream 114 it might stop further processing the data, automatically delete the received data, and notify the sending system (e.g., client system 102).

In some examples, system 200 is to receive a non-anonymized data stream 114 and automatically anonymize the received data prior to any further processing. In such cases, as illustrated by FIG. 2, system 200 may include anonymizing engine 208. Anonymizing engine 208 represents generally any combination of hardware and programming configured to cause anonymization of a received data stream 114 prior to further processing by engine 202.

Entropy computation engine 204 represents generally any combination of hardware and programming configured to cause compute a bit equivalent entropy of an anonymized data stream processed by processing engine 202. Examples on how computation engine 204 may compute the entropy are set forth below with respect to FIGS. 4 and 6.

Traffic control engine 206 represents generally any combination of hardware and programming configured to control traffic of data stream 114 based on the bit equivalent entropy computed by entropy computation engine 204. As set forth above, the computed entropy may be used as an indication on whether it is convenient to further transmit data stream 114 and/or to which specific target transmit it. For example, traffic control engine 206 may control traffic by inferring from the computed entropy whether further transmission of data stream 114 may compromise data security in view of a lack of cryptographic security of the data. Further, traffic control engine 206 may be to infer from the computed entropy data type of data stream 114. For performing these traffic control tasks, system 200 may incorporate at least one of cryptography check engine 210 or classification engine 212.

Cryptography check engine 210 represents generally any combination of hardware and programming configured to determine whether the data stream is encrypted and/or whether the data stream has a certain level of encryption based on the computed bit equivalent entropy. Examples on how cryptography check engine 210 may perform the cryptographic determination are set forth below with respect to FIGS. 4, 6, 8 and 9. Upon cryptography check engine 210 performing the cryptography check, engine 210 (or other suitably adapted engine) may further check cryptographic security of data stream 114 based on the computed bit equivalent entropy. Upon engine 210 determining that data in data stream 114 is cryptographically unsecure, traffic control engine 206 may restrict data stream 114 of being further transmitted via output 214.

Classification engine 212 represents generally any combination of hardware and programming configured to classify the type of data encoded in data stream 114 based on the computed bit equivalent entropy value. Examples on how classification engine 212 may perform the cryptographic determination are set forth below with respect to FIGS. 7 and 10A to 10C. Traffic control engine 206 may cause targeting output to a specific external system depending on the classification determined by engine 212.

In foregoing discussion, various components were described as combinations of hardware and programming. Such components may be implemented in a number of fashions. Looking at FIG. 3 the programming may be processor executable instructions stored on tangible memory media 302 and the hardware may include a processor 304 for executing those instructions. Memory 302 can be said to store program instructions that, when executed by processor 304, implement system 200 of FIG. 2. Memory 302 may be integrated in the same device as processor 304 or it may be separate but accessible to that device and processor 304.

In one example, the program instructions can be part of an installation package that can be executed by processor 304 to implement system 200. In this case, memory 302 may be a portable medium such as a CD, DVD, or flash drive or a memory maintained by a server from which the installation package can be downloaded and installed. In another example, the program instructions may be part of an application or applications already installed. Here, memory 302 can include integrated memory such as a hard drive.

In FIG. 3, the executable program instructions stored in memory 302 are depicted as an anonymized data processing module 306, an entropy computation module 308 and a traffic control module 310. In the illustrated example, an anonymizing module 312, a cryptography check module 314, and a classification module 316 are shown as optional executable program instructions that might be also incorporated in memory 302.

Anonymized data processing module 306 represents program instructions that when executed cause the implementation of anonymized data processing engine 202 of FIG. 2. Likewise, entropy computation module 308 represents program instructions that when executed cause the implementation of entropy computation engine 204. Likewise, traffic control module 310 represents program instructions that when executed cause the implementation of traffic control engine 208. Likewise, anonymizing module 312 represents program instructions that when executed cause the implementation of anonymizing engine 208. Likewise cryptography check module 314 represents program instructions that when executed cause the implementation of cryptography check module 210. Likewise classification module 316 represents program instructions that when executed cause the implementation of classification module 316.

Memory 302 may include operating system and applications (not shown) for further implementing functionality of the illustrated modules. An operating system represents a collection of programs that when executed by processor 304 serve as a platform on which the applications in memory 302 can run. Examples of operating systems include, but are not limited to, various versions of Microsoft's Windows® and Linux®. The applications represent program instructions that when execute by processor 304 function as an application that implement functionality of the illustrated modules.

Referring back to FIG. 2, the engines therein are described as combinations of hardware and programming. The hardware portions may be, depending on the example, implemented as processor 304 and memory 302. The programming portions, depending on the example, can be implemented by the operating system, the applications, or combinations thereof implementing the executable functionality of the modules depicted in FIG. 3.

Figure 4:
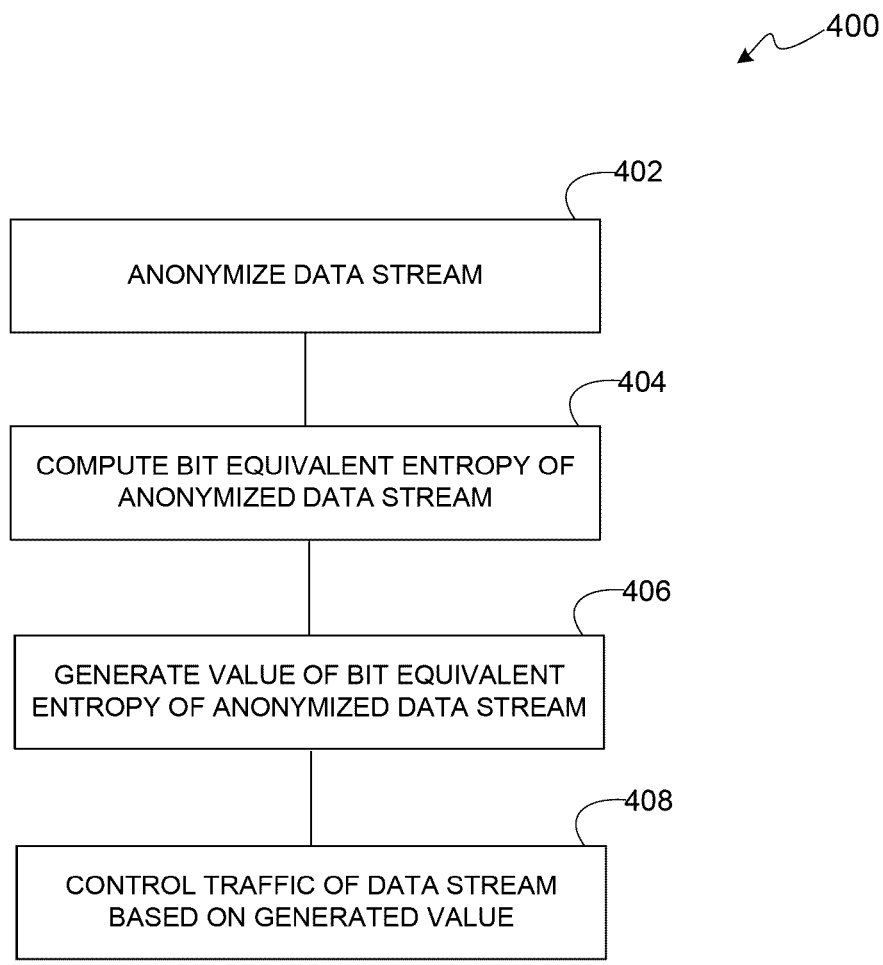
FIG. 4 is a flow diagram that implements examples of traffic control methods.
Figure 6:
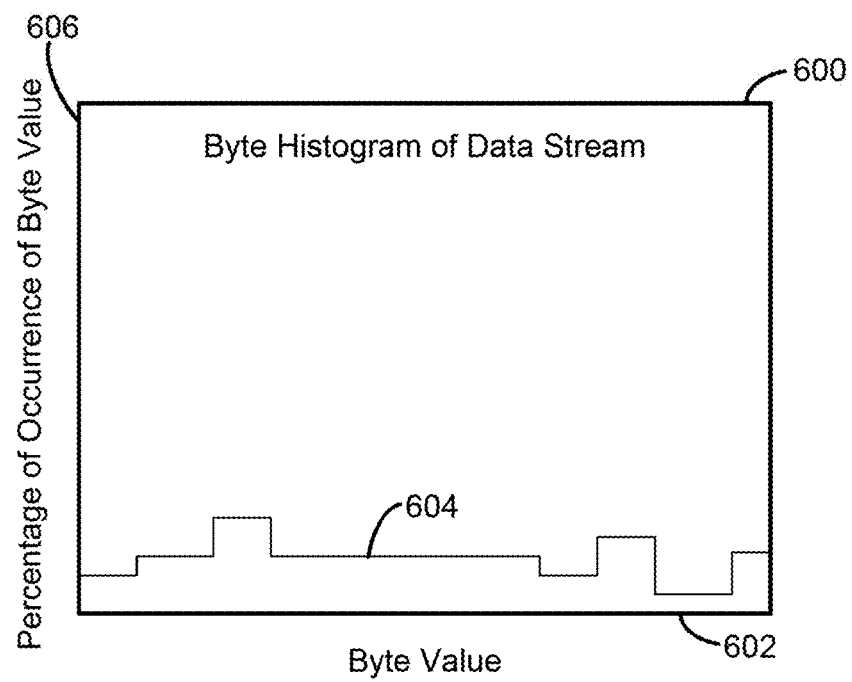
FIG. 6 is a schematic diagram illustrating a histogram of a data stream according to examples herein.
Figure 7:
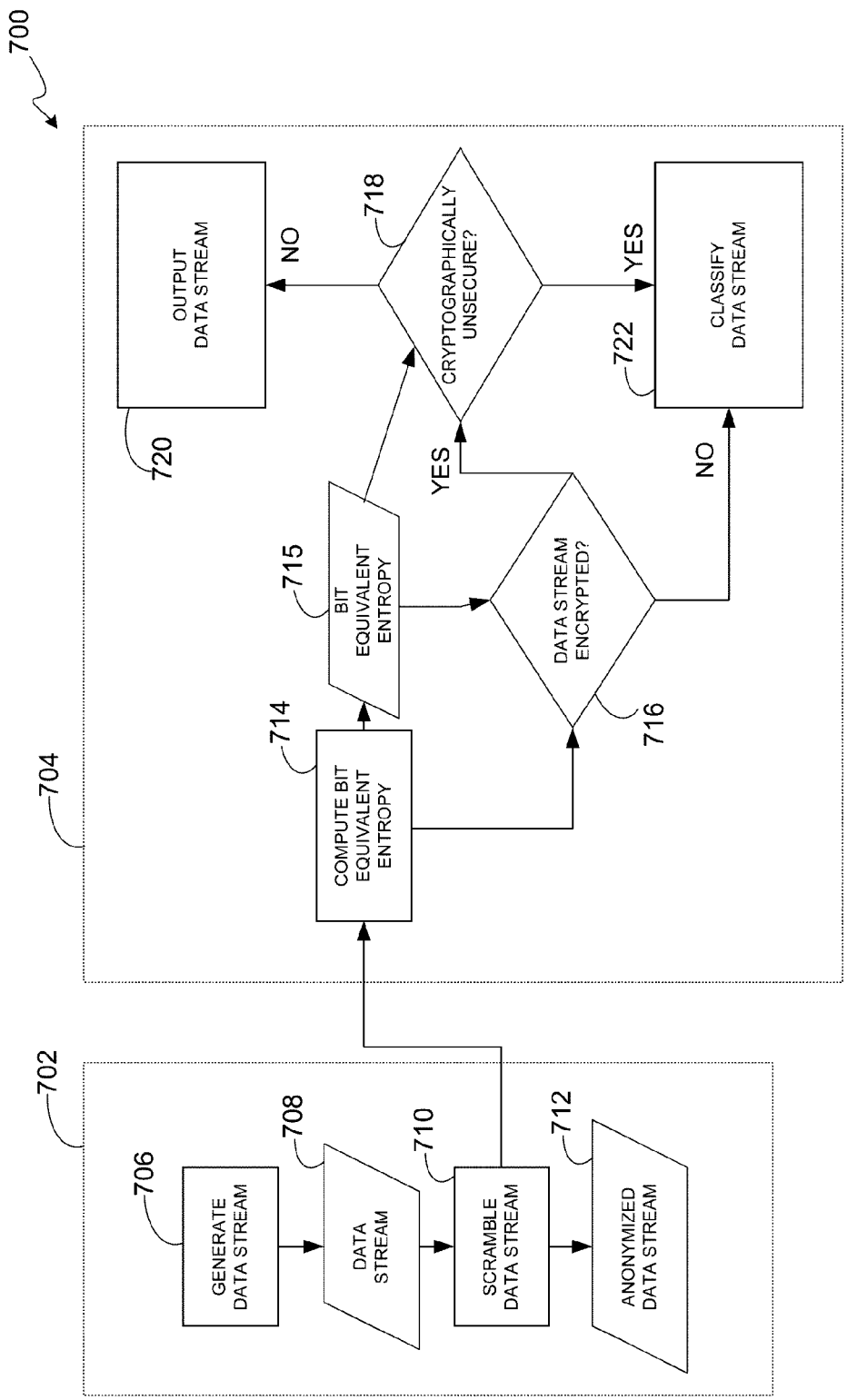
FIG. 7 is a flow diagram that implements examples of traffic control methods.

OPERATIONS: FIGS. 4 and 7 are flow diagrams that implement examples of traffic control methods. In discussing FIGS. 4, and 7, reference is made to the diagrams of FIGS. 1 to 3 provide contextual examples. Implementation, however, is not limited to those examples. Reference is also made to the examples depicted in FIGS. 5, 6 and 8 to 10C. Again, such references are made simply to provide contextual examples.

Figure 5:
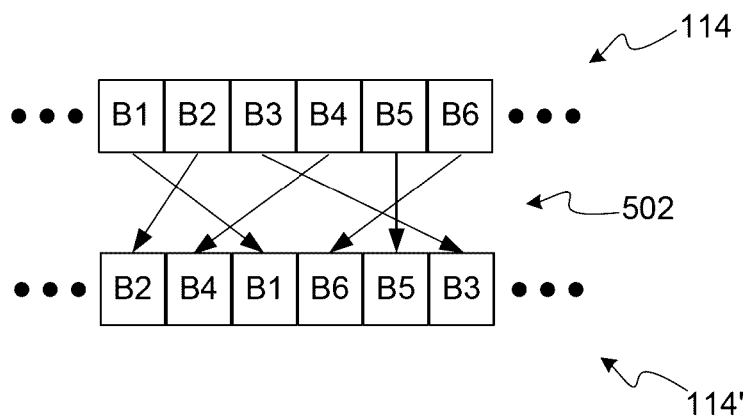
FIG. 5 is a schematic diagram illustrating anonymization of data streams.

Referring to FIG. 4, in process flow 400, at block 402 data stream 114 is anonymized. (As set forth above, examples herein do not necessarily anonymize a data stream, but they might directly process a stream anonymized by an external system, e.g., anonymization engine 122 at client system 102.) In at least some examples herein, anonymization is performed by scrambling, at least partially, data stream 114. FIG. 5 illustrates scrambling of data stream 114. As used herein, scrambling refers to a random re-arrangement of information units in a data stream. Information units may be bits, bytes (octets), or other units of information storage. In some examples herein, scrambling is performed on information units corresponding to bytes. In the example of FIG. 5, a portion of data stream 114 is composed of bytes B1 to B6 ordered sequentially in the stream. For anonymization, bytes B1 to B6 are subjected to a random re-arrangement 502. Random re-arrangement 502 may be registered and transmitted to a target system (e.g., any of target systems 106) for decoding data in anonymized data stream 114'.

Referring back to FIG. 4, at block 404, a bit equivalent entropy of the data stream anonymized at block 402 is computed. It will be understood that there are a variety of approaches for computing a bit equivalent entropy, some of these examples being illustrated in the following.

As set forth above, a data stream is divided in nbins units of digital information. For example, as illustrated by FIG. 5, data stream 114 is divided in 8 bytes. Further, a probability function p(i) may be associated with the data stream, which probability describes an estimation of how likely it is to find a specific value of a digital information unit i in the data stream. Probability function p(i) may be represented by a histogram, such as illustrated by graph 600 in FIG. 6. In the example of FIG. 6, a data stream is divided into bytes. The units of information in such a data stream may correspond to discrete values from 0 to 255 which correspond to horizontal axis 602 ("Byte Value") of graph 600. Histogram 604 correspond to the percentage of occurrence of byte values (represented at vertical axis 606) for a particular byte value as computed for a specific data stream. From such a definition of a data stream, a bit equivalent entropy may be computed as $$-\sum_{i=1}^{nbins} p(i)\ln(p(i)).$$

Therein, nbins would correspond to the number of unique values that can be stored in an information data unit. For a byte, nbins would be 256, as an 8-bit byte can hold values 0 to 225. Further, p(i) would correspond to an histogram as illustrated in FIG. 6.

In the illustrated example, histogram 600, and hence the computed entropy, corresponds to an anonymized data stream. Data stream might be anonymized without modifying entropy associated with the data stream. Thereby, it is facilitated data privacy without compromising reliable traffic control (anonymization of data that affects computation of entropy might lead to a false assessment of data cryptography and/or data classification). In an example in which an anonymized data stream is processed without modifying entropy associated with the data stream, the data stream includes data encoded in a plurality of bytes; at least one portion of the data stream is scrambled by a random re-arrangement of bytes in the data stream; the bit equivalent entropy of the anonymized data stream is computed using bytes as the data bin unit. In general, scrambling of data does not change the entropy as long as the same data unit is used for performing the scrambling and for computing the bit equivalent entropy.

While scrambling as described above is a convenient manner of anonymization that conserves entropy, it will be understood that there are other options for anonymization with entropy conservation. For example, each unit of digital information in the data stream (e.g., bytes) may be replaced with a predetermined unique value so that no information unit value maps to the same value. For example the 256 byte values could be mapped using a one to one function where 0, becomes 1, 1 becomes 2, and so on. Such an anonymizing mapping can be randomly generated for each data stream.

Referring back to FIG. 4, at block 406 a value of the bit equivalent entropy computed at block 404 of the anonymized data stream is generated. For example, referring back to FIGS. 2 and 3, entropy computation engine 126, 204 may compute and generate entropy value 130 and make it available to a traffic control engine 128, 206. At block 408, traffic of the data stream is controlled based on the value of the bit equivalent entropy generated at block 406. Examples of traffic control are discussed above with respect to FIGS. 1 to 3 and are further set forth below with respect to FIG. 7.

Referring to FIG. 7, process flow 700 illustrates traffic control methods. In the illustrated example, a set of blocks 702 may be implemented by a client system for generating an anonymized data stream 712 (e.g., client system 102 depicted in FIG. 1) and another set of blocks 704 may be implemented by a traffic control service system (e.g., traffic control service system 104 depicted in FIG. 1) for controlling traffic of data stream 712.

Regarding the client set of blocks 702, at block 706, a data stream 708 is generated. For example, referring to FIG. 1, server 112 may access data 110 in data store 108 and transmit the data as stream 114. At block 710, data stream 708 is anonymized by scrambling according to any of the examples disclosed herein so as to generate an anonymized data stream 712.

Regarding the traffic control service set of blocks 704, at block 714, a bit equivalent entropy 715 of the anonymized data stream 712 is computed according to any of the examples disclosed herein. Bit equivalent entropy 715 may be comprised of a single entropy value (e.g., the entropy computed for the complete or a portion of anonymized data stream 712) or might be comprised of one or more entropy curves built using entropy values for increasing stream sizes as illustrated in graph 800 of FIG. 8. Graph 800 shows an entropy curve 802 of a random data stream. Curve 802 is built by successively computing entropy of stream data as data is received. Horizontal axis 804 shows size in bytes of the received, and computed, data stream; vertical axis 806 shows the entropy values corresponding to different sizes of data stream. When data is encrypted, its bit equivalent entropy is similar to the bit equivalent entropy of a random data stream. Therefore, entropy curve 802, corresponding to a random data stream, may be used as a model entropy curve to determine whether and how a specific data stream is encrypted.

Figure 8:
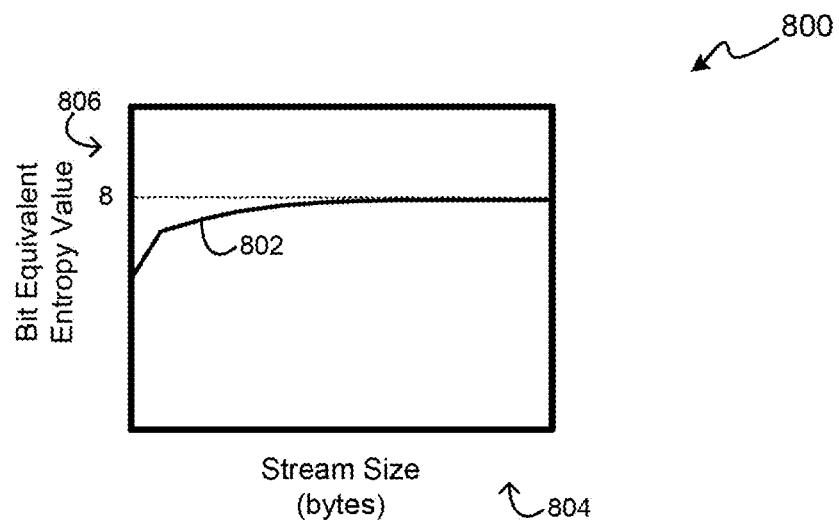
FIGS. 8 to 10C are graph illustrating entropy curves according to examples herein.

As can be seen from graph 800, entropy of a random data stream tends to converge to a specific limit entropy level. In the examples of FIGS. 8 to 10C, the information data unit of the data stream is a byte (i.e., 8 bytes). For such a configuration, as shown in FIG. 8, a random data stream tends to converge to an entropy value of 8 (for a 2-byte unit, the entropy value would converge to 16). Therefore, entropy values close to this specific limit entropy level are indicative of encrypted data. Further, a mismatch between a specific entropy curve and model entropy curve 802 is indicative of a data stream being cryptographically unsecure.

In the illustrated example, a determination on whether anonymized data stream 712 is suitably encrypted based on the bit equivalent entropy is performed at blocks 716 and 718. At block 716, it is determined whether data stream 716 is encrypted based on the computed bit equivalent entropy 715. At block 716, it might be evaluated whether computed bit equivalent entropy 715 is close to the specific limit entropy level $S_l$ indicative of data encryption (i.e., an entropy value of 8). For example, it might be evaluated whether a bit equivalent entropy 715 is in within 10% of $S_l$ or, more specifically, within 5% of $S_l$. If at block 716 it is determined that data stream 712 is not encrypted, then process flow 700 might go to block 722 to classify data stream 712. In another example, a model entropy population might be computed for random data streams having the same size as data stream 716; then, a z-test may be performed on data stream 716 to check whether the deviation from the model entropy population mean is significant, e.g., above a selected threshold value. Thereby, variations on entropy from data stream size can be taken into account to determine whether data stream 716 is encrypted.

If at block 716 it is determined that data stream 712 is encrypted, then at block 718 it might be determined whether data stream 712 is cryptographically unsecure. According to some examples, this determination might be performed by (i) computing an entropy curve of bit equivalent entropy values over size of the data stream (i.e., building an entropy curve as shown in FIG. 8), and (ii) determining whether the computed entropy curve matches within a selected range a selected random data entropy curve. If the match result is negative, it is determined that the data stream is cryptographically unsecure and process flow 700 might go to block 722 to classify data stream 712. If the match result is positive, then process flow 700 might go to block 720 to output data stream 712.

It will be understood that there are a variety of approaches to check match of entropy curves. For example, entropy population data can be computed for random strings of a specific size so that standard deviation values for the points on the model curve can be derived. Then, for each computed point on the specific entropy curve, a z-test can be performed. Passing a z-test at each point of the entropy curve is indicative of a positive match.

Figure 9:
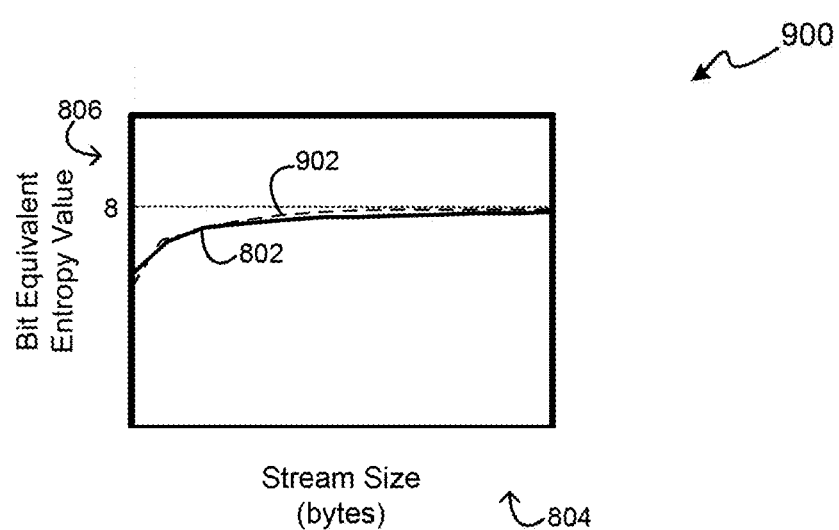

The determination at block 718 is further illustrated in the following using the example shown in FIG. 9. FIG. 9 shows a graph 900 wherein model entropy curve 802 (corresponding to a random data stream) is matched against a computed entropy curve 902 corresponding to a specific data stream (e.g., anonymized data stream 712). Computed entropy curve 902 indicates that the entropy of the associated data stream converges to the specific limit entropy level indicative of data encryption (i.e., an entropy value of 8). Therefore, at block 716 this specific data stream can be determined to be encrypted. Further, computed entropy curve 902 closely matches model entropy curve 802. Therefore, at block 716 this specific data stream can be determined not to be cryptographically unsecure.

Referring back to FIG. 7, process flow 700 might execute block 722 if it is determined that data stream 712 is not suitably encrypted. In the illustrated example, this determination is met if it is determined at block 716 that data stream 712 is not encrypted or if it is determined at block 718 that data stream 712 is cryptographically unsecure. The classification at block 722 might be performed by comparing computed entropy 715 with model entropies indicative of certain data types. For example, depending on the type of data, computed entropy 715 is in a different entropy range. Further, the shape of an entropy curve associated with computed entropy 715 varies according to the data type.

Figure 10A:
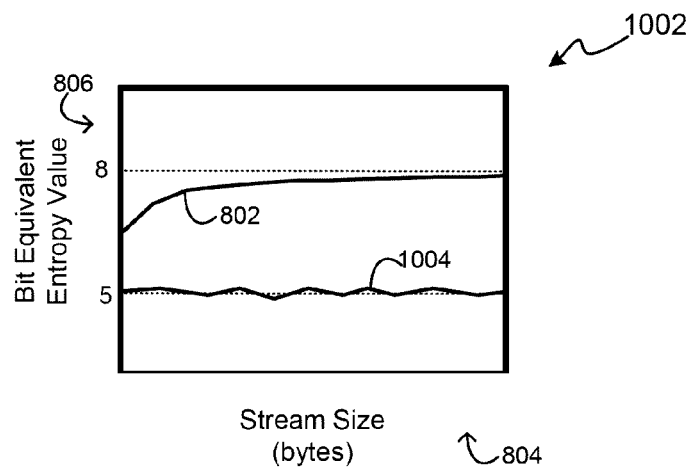
Figure 10B:
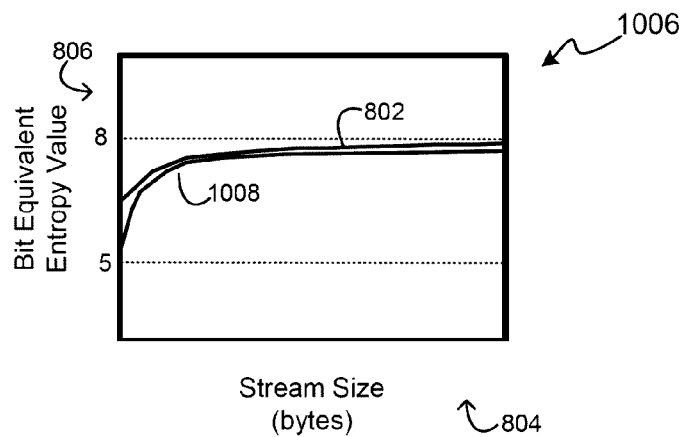
Figure 10C:
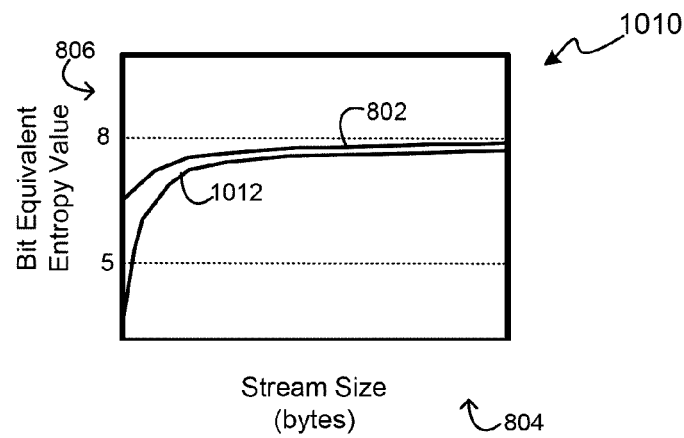

FIGS. 10A to 10C shows model entropy curves for three types of files: graph 1002 shows an entropy curve 1004 indicative of text data; graph 1006 shows an entropy curve 1008 indicative of jpeg data; and graph 1010 shows an entropy curve 1012 indicative of pst data. Graphs 1002, 1006, and 1010 include model entropy curve 802, corresponding to a random data stream, as reference. A set of sample files used by the organization associated with the client system might be used for generating model data to classify data stream 712 at block 722, i.e., any of model entropy curves 802, 1004, 1008, or 1012 as well as the associated limit entropy value.

A certain minimum data stream size might be used to obtain meaningful entropy values for data stream control as illustrated herein. This is also illustrated by the model entropy curves in FIGS. 8 to 10C. For example, as can be observed text files might not require much data to deliver meaningful entropy values. Entropy values associated to jpeg data might stabilize at, for example, 20 Kbytes.

The illustrated classification is facilitated when data is sequentially received in a data stream to deliver entropy curves close to those of the models. Therefore, data anonymization might impact correct classification. However, partial anonymization of a data stream might be performed in order to facilitate computation of entropy values meaningful for data classification. For example, a stream may be chunked. For example, a data stream might be split into short segments of data (e.g. segments between X and Y Kbytes size or dividing a segment of the stream corresponding to a file into a predetermined number of chunks like 100 so that for a 1 MB data stream file size, chunks of 10 k are generated). Then, data in the stream might be byte-scrambled within each chunk. Thereby an approximation to a "true" entropy curve might be obtained while ensuring anonymization of the data.

Process flow 700 facilitates real-time pervasive data analytics by enabling an anonymized analysis of organization data. Encryption of data can be assessed as well as classification of non-encrypted data. If data stream 708 is not encrypted or computed entropy 715 indicates that data stream 708 contains a xpossible data type of interest, data stream 708 might be re-directed for additional processing investigation or policy based downstream action. As illustration, the following policy table might be applied.

TABLE 1

| DATA STREAM TYPE | ACTION |
|---|---|
| Encrypted stream | Cryptographically secure - Policy A |
| Encrypted stream | Not cryptographically secure - Policy B |
| Unencrypted image | Policy C |
| Unencrypted text | Policy D |

Further, analogously as set forth above with respect to FIG. 1, values from the entropy computation at block 715 might be used to detect anomalies in data streams without keeping the actual historical data, but rather by keeping track of historical entropy values for streams. This might be used not solely for traffic control, but additionally for logging/anomaly detection. For example, if a server should only provide text files but stream entropy increases over time, it could be an indication of rogue data being stored on the server, or database poisoning.

It will be appreciated that examples above can be realized in the form of hardware, programming or a combination of hardware and the software engine. Any such software engine, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a tangible computer-readable storage medium that are suitable for storing a program or programs that, when executed, for example by a processor, implement embodiments. Accordingly, embodiments provide a program comprising code for implementing a system or method as claimed in any preceding claim and a tangible or intangible computer readable storage medium storing such a program. A tangible computer-readable storage medium is a tangible article of manufacture that stores data. (It is noted that a transient electric or electromagnetic signal does not fit within the former definition of a tangible computer-readable storage medium.)

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. In particular, techniques for data anonymization set forth herein may be applied in a variety of environments not limited to the specific examples illustrated above.

Flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting "a" or "an" with respect to a particular element contemplate incorporation of one or more such elements, neither requiring nor excluding two or more such elements. Further, at least the terms "include" and "comprise" are used as open-ended transitions.

What is claimed is:

1. A system for controlling data stream traffic, comprising:
a hardware processor to:
process a data stream at least partially scrambled by a random re-arrangement of information units in the data stream such that the entropy associated with the data stream is not modified so as to anonymize data encoded in the data stream;
compute a bit equivalent entropy of the processed data stream;
determine whether the data stream is suitably encrypted based on the bit equivalent entropy; and
controlling traffic of the data stream based on the computed bit equivalent entropy such that:
upon the data stream being determined to be suitably encrypted, allowing traffic containing the data stream, or
upon the data stream being determined as not being suitably encrypted, restricting traffic containing the data stream;
wherein determining whether the data stream is suitably encrypted includes:
computing an entropy curve of bit equivalent entropy values over size of the data stream; and
determining whether the computed entropy curve matches within a selected range a selected random data entropy curve, whereby, if the match result is negative, it is determined that the data stream is cryptographically unsecure.

2. The system of claim 1, wherein, upon the data stream being determined not to be encrypted, the processor is further to classify the type of data encoded in the data stream based on the computed bit equivalent entropy.

3. The system of claim 1, wherein the processor is further to scramble at least a portion of the data stream previous to the processing.

4. A method performed by a processor, comprising:
anonymizing a data stream by a random re-arrangement of information units in the data stream such that entropy associated with data encoded in the data stream is not modified;
computing, by the processor, a bit equivalent entropy of the anonymized data stream;
determining, by the processor, whether the data stream is suitably encrypted based on the bit equivalent entropy; and
upon the data stream being determined to be suitably encrypted, allowing traffic containing the data stream, or
upon the data stream being determined as not being suitably encrypted, restricting traffic containing the data stream;
wherein determining whether the data stream is suitably encrypted includes:
computing an entropy curve of bit equivalent entropy values over size of the data stream; and
determining whether the computed entropy curve matches within a selected range a selected random data entropy curve, whereby, if the match result is negative, it is determined that the data stream is cryptographically unsecure.

5. The method of claim 4, wherein
the data stream includes data encoded in a plurality of bytes; and
the bit equivalent entropy of the anonymized data stream using bytes as a data bin unit.

6. A computer software product comprising a non-transitory medium readable by a processor, the medium having stored thereon a set of instructions for controlling a data stream, the instructions comprising:
(a) a set of instructions which, when loaded into a memory and executed by the processor, causes processing of a data stream so as to anonymize data encoded in the data stream by a random re-arrangement of information units in the data stream such that the entropy associated with the data stream is not modified;
(b) a set of instructions which, when loaded into a memory and executed by the processor, causes computation of a bit equivalent entropy of the processed data stream; and
(c) a set of instructions which, when loaded into a memory and executed by the processor, causes determining whether the data stream is suitably encrypted based on the bit equivalent entropy;
(d) a set of instructions which, when loaded into a memory and executed by the processor, causes,
upon the data stream being determined to be suitably encrypted, allowing traffic containing the data stream, or
upon the data stream being determined as not being suitably encrypted, restricting traffic containing the data stream,
wherein determining whether the data stream is suitably encrypted includes:
computing an entropy curve of bit equivalent entropy values over size of the data stream; and
determining whether the computed entropy curve matches within a selected range a selected random data entropy curve, whereby, if the match result is negative, it is determined that the data stream is cryptographically unsecure.

7. The product of claim 6, wherein the bit equivalent entropy is computed as $$-\sum_{i=1}^{nbins} p(i)\ln(p(i)),$$

whereby nbins corresponds to the number of unique values that can be stored in an information data unit of the data stream, p(i) being a probability function of a unit of a specific unit of digital information i to be found in the data stream.

8. The product of claim 7, wherein the units of digital information correspond to bytes in the data stream.

\* \* \* \* \*